United States Patent [19]

Heiermann et al.

[11] Patent Number: 4,552,038
[45] Date of Patent: Nov. 12, 1985

[54] REMOTE CONTROLLED BOLT REMOVING APPARATUS FOR BOLTS SECURING THE HEAD OF A REACTOR PRESSURE VESSEL

[75] Inventors: Siegfried Heiermann, Waltrop; Hans Lachner, Herne, both of Fed. Rep. of Germany

[73] Assignee: Klockner-Becorit GmbH, Castrop-Rauxel, Fed. Rep. of Germany

[21] Appl. No.: 542,045

[22] Filed: Oct. 14, 1983

Related U.S. Application Data

[63] Continuation-in-part of Ser. No. 285,087, Jul. 9, 1981, abandoned.

[51] Int. Cl.[4] .............................................. B25B 29/02
[52] U.S. Cl. .................................. 81/57.38; 254/29 A
[58] Field of Search ................... 81/57.38; 254/29 A; 92/106; 279/4

[56] References Cited

U.S. PATENT DOCUMENTS

| | | | |
|---|---|---|---|
| 2,847,188 | 8/1958 | Wiltse | 92/106 |
| 2,959,156 | 11/1960 | Dreptin | 92/106 |
| 4,120,218 | 10/1978 | Togel et al. | 81/57.38 |

*Primary Examiner*—James L. Jones, Jr.
*Attorney, Agent, or Firm*—Collard, Roe & Galgano

[57] ABSTRACT

A remote controlled bolt removing device for bolts securing the head of a reactor pressure vessel is provided which includes a vertically movable rotating device which automatically grips and turns the bolts and at least one hydraulic cylinder for raising and lowering the rotating device. The device is provided with a rotating drive associated with the hydraulic cylinder which imparts a relative rotating movement between the piston and the cylinder during the operating stroke.

6 Claims, 2 Drawing Figures

Fig. 1

Figure 1:
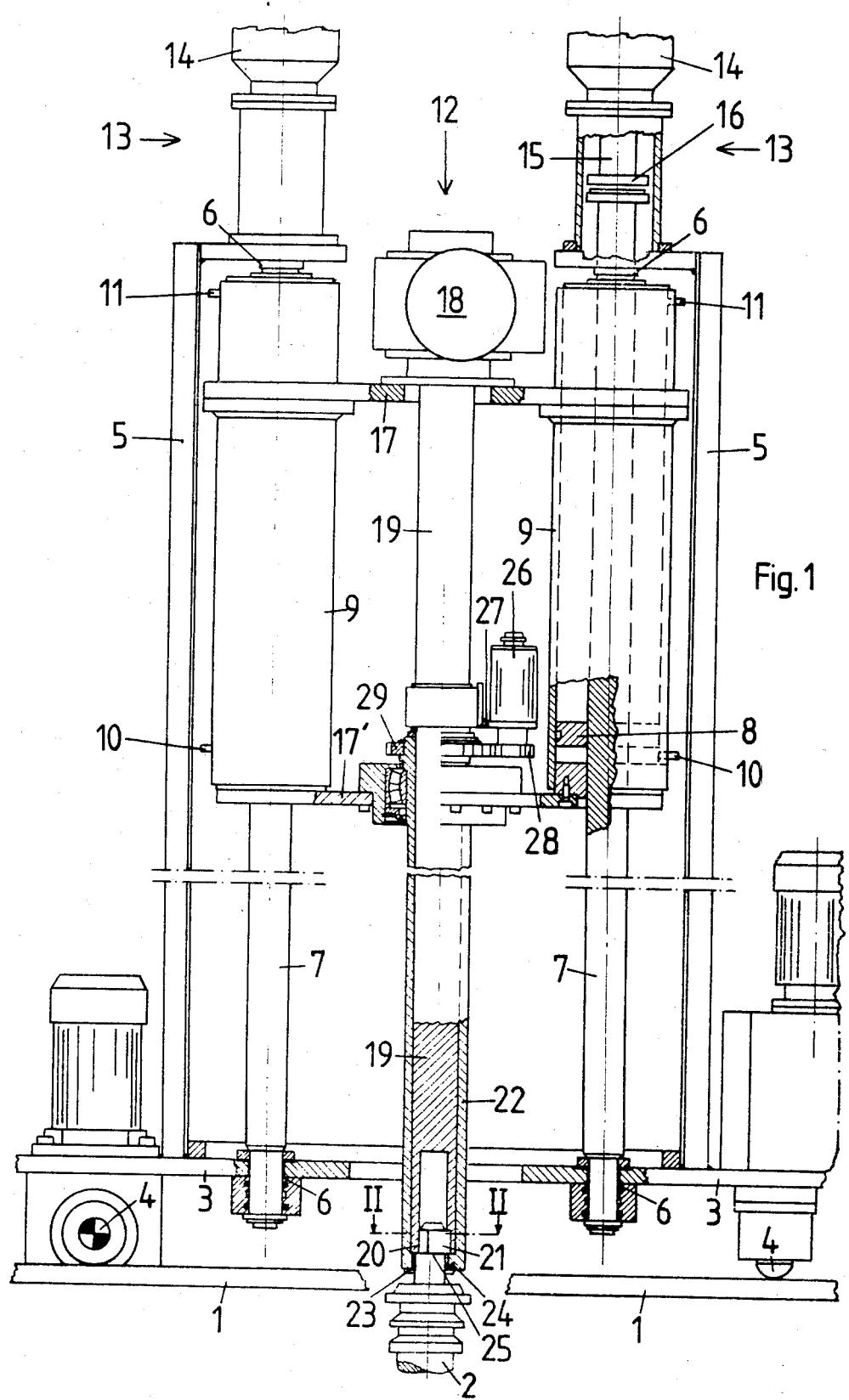
Figure 2:
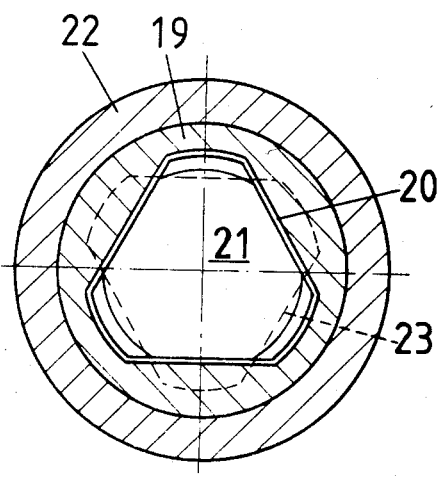

FIG. 2 is a cross sectional view taken along the line 2—2 in FIG. 1.

Now turning to the drawings, there is shown in FIG. 1 a bolt removing apparatus which may be moved in its entirety on a rail 1 above the screw tensioning device in such a manner that it may be positioned above the bolt heads of the individual bolts of the bolted head of a reactor pressure vessel (not shown). In FIG. 1, there is shown, by way of example, one of the bolts, designated 2, which is to be turned and removed from the head of a reactor pressure vessel. The bolt removing apparatus includes a base plate 3, to which are secured motor-driven trucks 4, which travel on rail 1. Rail 1 is generally provided to encircle the head of the reactor pressure vessel so that the bolt turning apparatus may be comprehensively utilized throughout.

A holding frame, designated 5, is secured to base plate 3 and supports two vertically extending piston rods 7, spaced at a distance from one another. Piston rods 7 are mounted to base plate 3 and frame 5 by means of bearings 6 which permit rotational movement of piston rods 7 about a vertical axis. Piston rods 7 are each rigidly connected, approximately at their centers, with pistons 8. Cylinders 9 are displaceably guided vertically along the piston rods 7 and pistons 8. Cylinders 9 are each provided at their lower and upper ends with connections 10 and 11, respectively, for pressure means. Thus, the cylinders may be raised or lowered by the alternate introduction thereto of pressure means via connections 10 and 11. The raising and lowering of the cylinders is relative to the piston rods 7 and the pistons 8, which in turn are non-displaceable in an axial direction.

Cylinders 9 jointly carry a bolt turning instrument, denoted in its entirety with the reference numeral 12, which will be more fully described hereinafter. So as to avoid any slip-stick effect arising during the raising and lowering of the bolt turning instrument 12 and bolt 2 suspended thereon, there are disposed in holding frame 5 above upper bearings 6 for piston rods 7, rotating drives 13. Rotating drives 13 are adapted to rotate piston rods 7 about their vertical axes. Each rotating drive 13 includes a slow running electric motor 14 whose drive shaft 15 is connected through coupling 16 with its associated piston rod 7.

Bolt turning instrument 12 is rigidly mounted to upper and lower carrier consoles 17 and 17', respectively, which are rigidly connected with cylinders 9. Bolt turning instrument 12 includes a drive motor 18, disposed at and engaged with the upper end of rotatable rod 19. The lower end of rotatable rod 19 is provided with Imbus-key surfaces 20 (see FIG. 2), which may be force-lockingly connected to the triangularly shaped upper end 21 of bolt 2. The lower portion of rotatable rod 19 has rotatably mounted thereon a sleeve 22 which projects beyond the lower end of the rotatable rod and includes at the lower end thereof a generally triangularly shaped opening 23. Triangularly shaped opening 23 is adapted to receive the triangularly shaped upper end 21 of bolt 2 therethrough. Furthermore, the triangularly shaped opening 23 of sleeve 22 includes inwardly directed projections 24 which are adapted to engage recess 25 below the upper end 21 of bolt 2 when sleeve 22 is rotated by 60° relative to bolt 2.

A rotatable motor, designated 26, is provided to rotate sleeve 22 relative to rod 19 or relative to bolt 2 which because of key surfaces 20, is engaged with rod 19 so as to be free from rotation with respect to the rotatable rod 19. Motor 26 is supported on a carrier console, designated 27, which is in turn connected with rotatable rod 19 so as to be free from relative rotation therewith. Motor 26 drives a toothed wheel or gear, designated 28, which in turn engages toothed wheel or gear 29 disposed on the outer perimeter of rotatable sleeve 22 to thereby rotate sleeve 22 with respect to rod 19.

In operation, when it is necessary to remove a bolt from the bolted head of a reactor pressure vessel, the bolt removing apparatus is caused to travel on rail 1 by means of trucks 4 to a position over a bolt 2 to be removed or unscrewed. Then, the bolt turning instrument 12 is lowered by an appropriate introduction of pressure medium through connections 10 and 11 of cylinders 9. In the embodiment shown in FIG. 1 the pressure medium is introduced via connection 10 thereby causing cylinders 9 to move downwardly. Cylinders 9 and hence turning instrument 12 are thus lowered until key surfaces 20 of rotatable rod 19 surround the triangularly shaped upper end 21 of bolt 2. Then, by means of rotatable motor 26, rotatable sleeve 22 is rotated by 60° so that projections 24 of rotatable sleeve 22 engage the recess 25 of bolt 2. In this manner, bolt 2 is connected in a tension-proof manner with the turning instrument 12.

Next, drive motor 18, the pressure means introduction to the hydraulic cylinder systems, which include cylinders 9, pistons 8 and piston rods 7, and the rotating drives 13 are actuated simultaneously. The lifting force produced by cylinders 9 acting on turning instrument 12 is sufficiently large that during the unscrewing of bolt 2, the thread is free from the load produced by the weight of bolt 2. In view of the relative rotating movement between cylinder 9 on the one hand and rod 7 and piston 8 on the other hand, a "slip-stick-effect" is avoided during the lifting movement of bolt turning instrument 12.

The sealing friction between the seals of pistons 8 and the walls of cylinders 9 is regulated high enough that when standing still or at rest, the adhesive friction resistance thereof is larger than the difference in the forces loading cylinders 9, i.e. the unloading force minus the combined weight of bolt turning instrument 12 and bolt 2 suspended therefrom. In this manner, the static frictional resistance between pistons 8 and cylinders 9 causes these elements to act as simple and reliably acting stand-still brakes.

It is also possible to deviate from the example shown in the drawing so that cylinders 9 are rotatably driven and rods 7 and pistons 8 are arranged to be non-rotatable, since only a relative rotation of these parts during the lifting stroke is important for the purpose of avoiding a slip-stick effect.

During replacement of bolts 2 in the head of the reactor pressure vessel, while unloading the screw thread, the above described process is merely reversed.

It is to be understood that the foregoing general and detailed descriptions are explanatory of the present invention and are not to be interpreted as restrictive of the scope of the following claims.

What is claimed is:

1. A bolt removing apparatus for removing bolts securing the head of a reactor pressure vessel, said apparatus comprising:

(a) a vertically moveable bolt rotating device which includes means for gripping and turning a bolt to be removed;

REMOTE CONTROLLED BOLT REMOVING APPARATUS FOR BOLTS SECURING THE HEAD OF A REACTOR PRESSURE VESSEL

This is a continuation-in-part application of co-pending application Ser. No. 285,087, filed July 9, 1981, now abandoned entitled "REMOTE CONTROLLED SCREW TURNING DEVICE FOR SCREWS OF A HEAD BOLTING OF A REACTOR PRESSURE CONTAINER".

The present invention relates to a remote controlled bolt turning and removing apparatus for the bolts securing the head of a reactor pressure vessel. More particularly, the present invention relates to a remote controlled raising and lowering apparatus which automatically grips and turns the bolts securing the head of a reactor pressure vessel. The apparatus includes at least one hydraulic cylinder for raising and lowering the rotating apparatus.

Bolts which are utilized in securing or bolting on the heads of reactor pressure vessels are necessarily massive and of relatively large weight. This is necessary because of the extreme pressures found in such vessels. It is necessary, for periodic maintenance and repairs, to occasionally remove these head bolts in order to permit access to the pressure vessels. Merely unscrewing such large bolts often results in damage to the screw threads of the bolts themselves and of the reactor pressure vessel. It is therefore important, both from an economic and safety point of view, to prevent such damage from occurring.

In known bolt turning devices in accordance with the state of the art (see German Patent No. 26 40 991), it is therefore an important consideration that the bolt threads and threads in the reactor pressure vessel be protected. Optimum results are obviously attained if pressure is exerted on the hydraulic cylinder which raises and lowers the rotating device to the extent necessary to compensate exactly for the weight of the rotating drive and the bolt suspended therefrom. Such devices, which themselves are massive, are normally mounted on rails which encircle the bolted head of the reactor pressure vessel and are remote controlled.

In such known state of the art devices, difficulties are encountered despite a proper hydraulic admittance of the hydraulic fluid to the hydraulic cylinder due to what is called the "slip-stick-effect". This effect results from the phenomenon that static friction is greater than sliding friction, and therefore there results sudden changes in the frictional resistance during the transition from one type of friction to another. Since the hydraulic medium used in such apparatus is elastic, or if it is not elastic it flows through lines which are elastic, changes are constantly occurring particularly in such slow driven hydraulic cylinders, between starting and resting, i.e. between sliding friction and static friction. This results in a very unsteady operation of the hydraulic cylinders as a result of the continuously powerful load changes.

Due to this "slip-stick-effect", the screw threads and the pressure vessel flange itself are unfavorably stressed by the bolt turning apparatus hereinabove described. Furthermore, it is not possible to exactly adjust the release forces. One means of reducing the "slip-stick-effect" is by using special sealing materials in the hydraulic cylinder system between the piston and the cylinder to provide a low frictional resistance. Another method is to provide a loose friction fit between the piston and the cylinder. Both measures reduce "slip-stick-effect" to a certain extent but neither can completely overcome it.

It is, therefore, a primary object of the present invention to eliminate the so called "slip-stick-effect" occurring in the hydraulic cylinder system for raising and lowering the rotating device of a remote controlled bolt removing apparatus for removing the head bolts of a reactor pressure vessel.

This object, as well as others which will hereinafter become apparent, is accomplished in accordance with the present invention by the provision of a bolt removing apparatus of the aforementioned type which additionally includes a rotating drive associated with the hydraulic cylinder system by which a relative rotating movement is generated between the piston and the cylinder during the operation of the apparatus.

In the bolt turning apparatus according to the present invention, the frictional components, i.e. static and sliding friction, transverse to the rotational movement between the piston and the cylinder, as well as between the piston rod and its bushings, effected by the constant relative rotating movement between the piston and the cylinder, are very nearly eliminated during the operation of the hydraulic cylinder system. In order to eliminate such frictional resistance, it is necessary that the direction component of rotating movement be at right angles with respect to the direction component of axial displacement and that the speeds of these movements be different. In the bolt removing apparatus in accordance with the present invention, the hydraulic cylinder system responds exactly to the corresponding pressure admittance without the distortions normally caused by the "slip-stick-effect".

The nearly complete elimination of frictional resistance in the direction of the operating stroke of the apparatus makes it possible to provide a relatively high friction fit between the piston and the cylinder which heretofore was not possible because of the necessity for reducing the "slip-stick-effect". One resultant advantage is that increased sealing is obtained between the piston and the cylinder. In addition, the friction fit between the piston and the cylinder may be adjusted to such a high degree that the static friction resistance may be larger in the rest position of the piston and cylinder than the difference between the unloading force of the hydraulic cylinder and the loaded weight forces. Thus, the hydraulic cylinder may be used advantageously as a shut-down brake which becomes effective as soon as the rotating drive and the hydraulic medium admittance is shut off. This was not possible in the heretofore known bolt removing devices since there was insufficient static friction to be used in this manner. Thus, it was necessary to employ other types of shut down brakes which are much more complicated and therefore more expensive.

For spatial as well as construction reasons, it is preferable to provide two hydraulic cylinders at opposite sides of the rotating device. In addition, the rotating drives are preferably slow running electric motors.

The present invention will be described and understood more readily when considered together with the accompanying drawings, in which:

FIG. 1 is a side elevational view of the bolt removing apparatus, partly in cross section, according to the present invention;

(b) at least one hydraulic cylinder system, including a cylinder, a piston and a piston rod, coupled to said bolt rotating device for vertically moving said device; and (c) means for causing rotational movement between said cylinder and piston of said hydraulic cylinder system as said bolt rotating device is moved vertically by said hydraulic cylinder system.

2. The bolt removing apparatus as defined in claim 1, wherein said means for causing rotational movement between said cylinder and piston of said hydraulic cylinder system includes a rotating drive coupled to said hydraulic cylinder system.

3. The bolt removing apparatus as defined in claim 1, wherein the speed of rotation between the cylinder and piston is different than the speed of vertical movement of said bolt rotating device.

4. The bolt removing apparatus as defined in claim 1, wherein a friction fit is provided between said piston and said cylinder such that the static friction resistance between said piston and said cylinder is greater than the difference between the unloading force of the hydraulic cylinder system and the load of the weights acting thereon.

5. The bolt removing apparatus as defined in claim 1, which further includes a support frame, two synchronously-operated hydraulic cylinder systems provided on opposite sides of said rotating device, the cylinders of said systems being rigidly connected with said rotating device and the piston rods thereof being rotatably mounted in said support frame, and a rotating drive for each of said piston rods being mounted on said support frame.

6. The bolt removing apparatus as defined in claim 5, wherein said rotating drives comprise slow-running electro-motors.

* * * * *